(12) United States Patent
Carroll

(10) Patent No.: US 6,276,492 B1
(45) Date of Patent: Aug. 21, 2001

(54) PUSH ROD ACTIVATED GREASE NOZZLE

(75) Inventor: John B. Carroll, Irwin, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/520,135

(22) Filed: Mar. 7, 2000

(51) Int. Cl.$^7$ .................................................. F16N 7/34
(52) U.S. Cl. ................ 184/55.1; 184/105.2; 251/63.6; 239/423; 239/584
(58) Field of Search ............................. 184/3.1, 3.2, 39, 184/50.2, 55.1, 57, 105.1, 105.2; 251/63.6; 239/419, 423, 584

(56) References Cited

U.S. PATENT DOCUMENTS

| | | | |
|---|---|---|---|
| 712,461 | * 10/1902 | Rumboski | 184/105.2 |
| 1,961,477 | * 6/1934 | Davis | 184/55.1 |
| 2,103,733 | * 12/1937 | Powers | 184/55.1 |
| 2,190,554 | * 2/1940 | Tecca et al. | 184/55.1 |
| 3,516,516 | * 6/1970 | Bertva et al. | 184/55.1 |
| 3,801,021 | * 4/1974 | Jakob | 239/584 |
| 3,980,237 | * 9/1976 | Parrish, Jr., | 239/584 |
| 4,421,292 | * 12/1983 | Matsui et al. | 251/63.6 |
| 4,534,449 | * 8/1985 | Larson | 184/105.2 |
| 5,148,024 | * 9/1992 | Watanabe | 239/584 |
| 5,707,010 | * 1/1998 | Manfre et al. | 239/584 |
| 5,873,528 | * 2/1999 | Lewis et al. | 239/584 |
| 5,899,387 | * 5/1999 | Haruch | 239/419 |
| 5,960,821 | * 10/1999 | Johnson | 251/63.6 |
| 6,145,625 | * 11/2000 | Prokop et al. | 184/105.2 |
| B1 6,168,094 | * 1/2001 | Schatz et al. | 239/584 |
| B1 6,170,760 | * 1/2001 | Bienvenue et al. | 239/584 |

FOREIGN PATENT DOCUMENTS

| | | | | |
|---|---|---|---|---|
| 295701 | * 12/1988 | (EP) | ...... | 184/105.2 |
| 556817 | * 10/1943 | (GB) | ...... | 184/55.1 |
| 984886 | * 3/1965 | (GB) | ...... | 184/105.2 |
| 1210199 | * 10/1970 | (GB) | ...... | 184/105.2 |

* cited by examiner

Primary Examiner—Thomas R. Hannon
Assistant Examiner—Chong H. Kim
(74) Attorney, Agent, or Firm—James Ray & Associates

(57) ABSTRACT

The present invention provides an assembly for dispensing a lubricant. The assembly comprises a housing with a cavity and a nozzle member connected to the housing. The housing further includes a lubricant passage connectable to a source of pressurized lubricant and a fluid pressure inlet passage connected to a source of fluid pressure. The assembly further includes a piston member having a predetermined configuration with a first side in fluid communication with the fluid pressure passage and a second side and having a piston cavity formed within. There is a first bore extending through the piston. A retainer member is connected to such first side of the piston member. A valve device is biased by an urging device against the first bore preventing grease from exiting. Another urging device biases the piston to such closed position. A push rod is disposed within the first bore and extends a predetermined distance beyond an end of the second side of the piston. When fluid pressure enters the cavity, it forces the piston to the left and the urging device forces the ball valve and the push rod to the left until the push rod contacts resistance. The piston member continues to move to the left for such predetermined distance until it also contacts resistance. The push rod thereby preventing the valve device from pressing against the piston bore and thus permits grease to flow. Grease passes through a second bore, is mixed with fluid pressure and is expelled as a spray from the nozzle member.

13 Claims, 1 Drawing Sheet

PUSH ROD ACTIVATED GREASE NOZZLE

FIELD OF INVENTION

The present invention relates, in general, to a lubrication system used to lubricate the flanges of the wheels of a railroad locomotive and, more particularly, the present invention relates to a flange lubricator nozzle assembly.

BACKGROUND OF THE INVENTION

Wheel treads are designed to adhere to the running surface (top) of the rails of a railway track essentially by means of friction. It is this friction between the treads and the top of the rails that allows the wheels to gain traction on the rails as the wheels rotate and thereby propel the train along the tracks. A wheel flange is that tapered projection that extends completely around the inner portion of the rim of a wheel. The wheel flanges are designed to keep the wheels or wheelsets on the railway track by limiting lateral movement of the wheels or wheelsets against the inside surface of either rail.

Due to their contact with the railway track, the wheels of a locomotive suffer wear over time, particularly on their treads and to a lesser extent on their flanges. The treads, of course wear as a result of their direct contact against the top of the rail. During braking the treads may suffer wear more severely if the wheels should happen to slip or lockup as they slide along the rail. The wheel flanges suffer wear due to their contact with the inside surfaces of the rails. This is particularly pronounced as the trains negotiate curves in a railway track. On such curves the flange portion of the wheel makes very firm contact with inside surface of the rails.

Wheel lubrication systems are one of the many systems that the railroad industry uses to prolong the useful life of a railroad wheel. Such wheel lubrication systems are used to lubricate the flange of the wheels of a railroad locomotive. These flange lubrication systems include both wayside lubricators and on-board lubricators.

In these systems nozzles have, through the years, proven to be the least reliable component of the wheel flange lubrication system. Some prior art nozzles have employed a steel ball as a check valve internally to prevent or permit the delivery of a dose of lubricant. When the spray solenoid is deenergized, the ball valve is biased to a closed position in which the pressurized lubricant is blocked from exiting the nozzle. When the solenoid is energized the force of air moves the ball valve to an open position and allows the lubricant to flow out of the nozzle and onto the wheel flange.

These prior art nozzles have not fared well in the railroad environment where they are intended to be used. Dirt, dust and other debris can work their way into the nozzle and after a while impede the movement of the internal ball valve. In many of these instances the ball valve would tend to stick in a closed position regardless of the state of the solenoid. When this occurs lubricant is not expelled from the nozzle because the grease path is blocked by the ball valve.

SUMMARY OF THE INVENTION

The present invention provides an assembly for dispensing lubricant. The assembly comprises a housing member, a cavity formed in the housing member and a nozzle member connected to the housing member. There is an exhaust passage formed within the nozzle member that is in fluid communication with such cavity. The housing further includes a lubricant passage connectable to a source of lubricant under pressure and a fluid pressure inlet passage connectable to a source of fluid pressure. The fluid pressure inlet passage is in fluid communication with at least a portion of the cavity.

There is also a piston member having a predetermined configuration disposed in the cavity for reciprocal movement. The piston member having a first side adjacent the fluid pressure inlet passage and a radially opposed second side. There is a piston cavity formed in the first side of the piston member. A first sealing means is disposed around the piston member intermediate the first side and the radially opposed second side. Such first sealing means is in sealing engagement with a wall of the cavity for both dividing the cavity into a first cavity portion in fluid communication with the fluid pressure inlet passage and a second cavity portion and preventing fluid communication between the fluid pressure inlet passage and the second cavity portion.

The assembly further includes a first bore extending longitudinally through the piston member. Such first bore is in fluid communication with the lubricant passage and with the piston cavity. There is a second sealing means disposed closely adjacent an end of the second side of the piston member for preventing leakage between the lubricant passage and the second cavity portion.

The assembly includes a first urging means disposed in the second cavity portion of the cavity and caged between an end wall of the second cavity portion and a portion of the second side of the piston member facing the end wall for biasing such piston member into a closed position. A valve means is disposed in the piston cavity. Such valve means is in contact with a first end of the piston bore for controlling the passage of lubricant.

There is a retainer member having a second predetermined configuration. A portion of a first side of such retainer member is connected to the first side of the piston member. A portion of such first side of such retainer member is disposed within the piston cavity and a portion of a second side extends into such exhaust passage of such nozzle member. The retainer member is also disposed for reciprocal movement. There is a second bore extending longitudinally through the retainer member and in fluid communication with such piston cavity and is also in fluid communication with such exhaust passage in the nozzle member. The second bore is further in fluid communication with the first bore when the piston member is in a discharge position.

A second urging means is disposed in the piston cavity and caged between a wall of such retainer member facing such first end of such first bore and the valve means. The second urging means exerts pressure on the valve means and forces the valve means against the first bore thereby preventing such lubricant in the first bore from passing through to the piston cavity and to the second bore while the piston member is in a closed position.

A push rod is disposed within the first bore. Such push rod extends a predetermined distance beyond an end of the second side of the piston member. There is a predetermined clearance between an outer surface of the push rod and an inner surface of the first bore. One end of the push rod contacts the valve means.

The piston member and the retainer member are slidingly movable against the first urging means from a closed position to a discharge position when such source of fluid pressure is introduced into the first cavity portion of the cavity permitting such fluid pressure to act upon the retainer member and the piston member such that the retainer member and the piston member are moved compressing the first urging means while the second urging means continues to exert pressure on the valve means thereby moving the valve means and the push rod until the push rod contacts resistance. The piston member and the retainer member continue to move for such predetermined distance until the end of the second side of the piston member also contacts resistance. The push rod prevents the valve means from contacting the first bore thereby permitting such lubricant in the first bore to be in fluid communication with the piston cavity and the second bore and such lubricant from the second bore being mixed with such fluid pressure in the exhaust passage is forced through the exhaust passage and expelled out of the nozzle member.

OBJECTS OF THE INVENTION

It is, therefore, a primary object of the present invention to provide a nozzle assembly that will reliably dispense a metered amount of lubricant onto the flange of the wheel of a railroad locomotive.

Additionally, it is an object of the invention to provide a nozzle assembly that will have a positive actuation and release of the ball check valve.

It is still another object of the present invention to provide a nozzle assembly wherein a push rod is used as a positive actuator.

Another object of the present invention is to provide a reliable nozzle assembly that is not too expensive to manufacture.

These and various other objects and advantages of this invention will become apparent after a full reading of the following detailed description, particularly, when read in conjunction with the attached drawings as described below and the appended claims.

Figure 1:
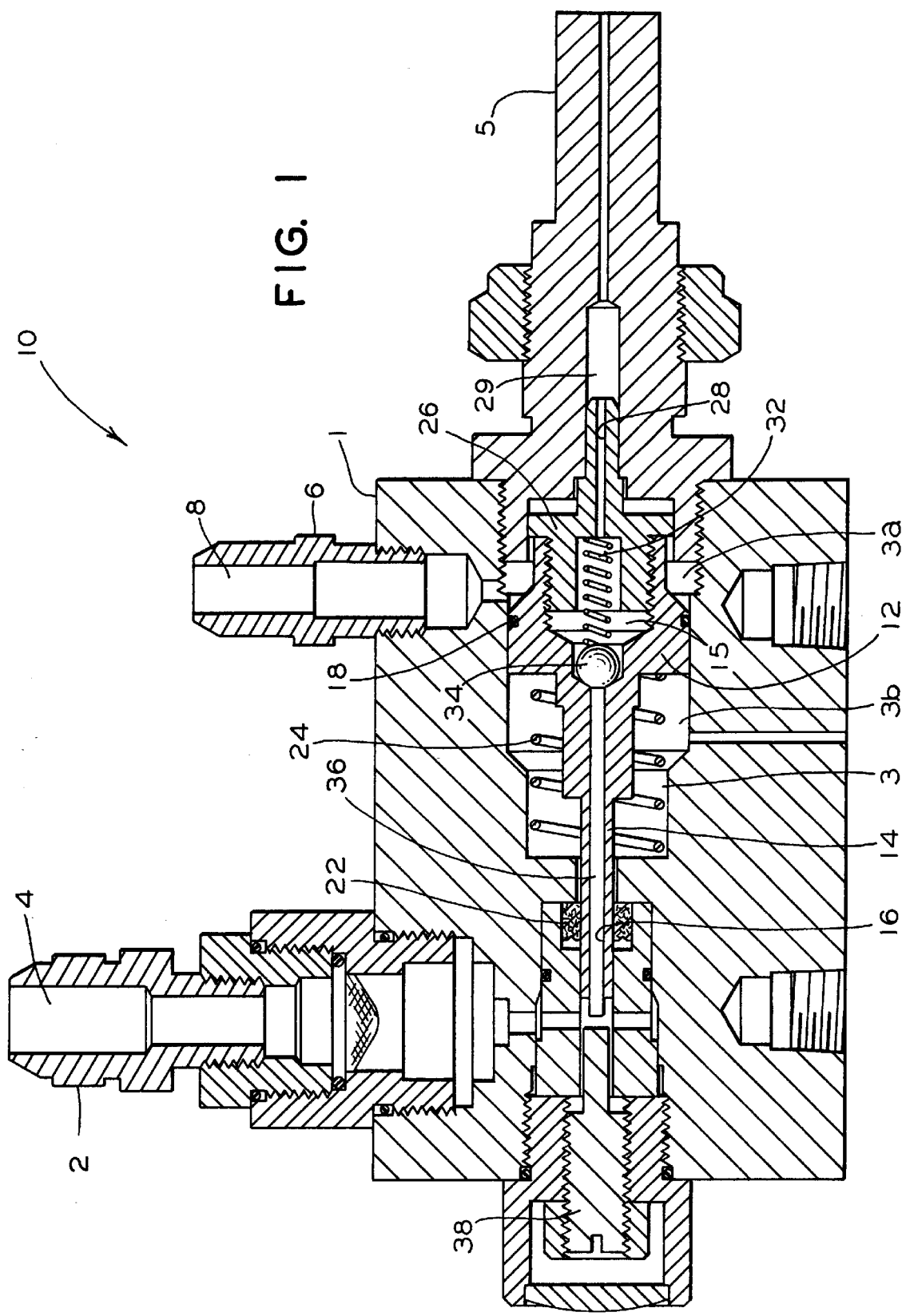
FIG. 1 is a cross sectional view of a push rod activated nozzle in an embodiment of the invention.

BRIEF DESCRIPTION OF THE PRESENTLY PREFERRED AND ALTERNATE EMBODIMENTS OF THE INVENTION

Reference is now made to FIG. 1. Illustrated therein is an assembly, generally referred to as 10, according to a first embodiment of the invention. Assembly 10 is used to dispense a lubricant. The lubricant used in the assembly 10 may be a variety of lubricants; however, it is presently preferred that such lubricant is a grease. For convenience the lubricant may be referred to as a grease hereinafter and the words may be interchangeable.

Such assembly 10 comprises a housing member 1 which includes a cavity 3 and a nozzle member 5 connected to the housing 1. The housing member 1 further includes a grease fitting 2 which is connectable to a source of grease under pressure (not shown). Grease fitting 2 has a grease passage 4 which carries grease to the inner part of the housing member 1. There is also an fluid pressure fitting 6 which is connectable to a source of fluid pressure (not shown). Such fluid pressure fitting 6 has a fluid pressure inlet passage 8 which is in fluid communication with the cavity 3 of housing member 1. It is presently preferred that such fluid pressure be air pressure.

Such assembly 10 further includes a piston member 12. Such piston member 12 is disposed in the cavity 3 for reciprocal movement and has a predetermined configuration. Such piston member 12 has a first side which is adjacent to the fluid pressure inlet passage 8 and a radially opposed second side. The piston member 12 has a piston cavity 15 formed in its first side. There is a first bore 16 which extends longitudinally through such piston member 12. Such first bore 16 is in fluid communication with grease passage 4 and with piston cavity 15. It is presently preferred that such piston bore 16 be disposed substantially in the center of such piston member 12.

A first sealing means 18 is disposed around such piston member 12 intermediate the first side and the radially opposed second side. First sealing means 18 is in sealing engagement with a wall of cavity 3 for essentially dividing the cavity 3 into a first cavity portion 3a that is in fluid communication with the fluid pressure inlet passage 8 and a second cavity portion 3b. First sealing means 18 prevents any fluid communication between such fluid pressure inlet passage 8 and such second cavity portion 3b. In the preferred embodiment of the invention such first sealing means 18 is a resilient seal.

There is a second sealing means 22 disposed closely adjacent an end of the second side of piston member 12. Second sealing means 22 prevents any leakage between the grease passage 4 and the second cavity portion 3b so as to insure that the grease from the grease passage 4 passes into the first bore 16.

The assembly 10 further includes a first urging means 24. Such first urging means 24 is disposed in the second cavity portion 3b of the cavity 3 and is caged between an end wall of such second cavity portion 3b and a portion of such second side of such piston member 12 facing such end wall for biasing the piston member 12 into a closed position. It is presently preferred that such first urging means 24 is helical spring. It is, further, presently preferred that such spring 24 have a predetermined preload.

A valve means 34 is situated in the piston cavity 15. The valve means 34 is in contact with the first end of the first bore 16 for controlling the flow of grease from the first bore 16. In the presently preferred embodiment of the invention such valve means 34 is a ball valve.

The assembly 10 further includes a retainer member 26 that has a second predetermined configuration. A portion of a first side of such retainer member 26 is connected to the first side of piston member 12. The retainer member 26 is also disposed for reciprocal movement. At least a portion of such first side of retainer member 26 is disposed within the piston cavity 15 and a portion of a second side of such retainer member 26 extends into the exhaust passage 29 of nozzle member 5.

There is a second bore 28 which extends longitudinally through such retainer member 26. Second bore 28 is in fluid communication with the piston cavity 15 and in fluid communication with the exhaust passage 29 of nozzle member 5. Such second bore 28 is further in fluid communication with the first bore 16 when the piston member 12 is in a discharge position. It is presently preferred that such second bore 28 be disposed substantially through the longitudinal center of such retainer member 26.

There is a second urging means 32 which is disposed in the piston cavity 15. Second urging means 32 is caged between a wall of such retainer member 26 facing such first end of the first bore 16 and such valve means 34. Such second urging means 32 exerts pressure on such valve means 34 and forces valve means 34 against first bore 16 thereby preventing any lubricant in such first bore 16 from passing through to the piston cavity 15 and the second bore 28 when the piston member 12 is in a closed position. In the presently preferred embodiment of the invention such second urging means 32 is a helical spring. Further, it is presently preferred that such helical spring 32 have a predetermined preload.

The assembly 10 has a push rod 36 which is disposed within the first bore 16. Push rod 26 extends a predetermined distance beyond the end of the second side of the piston member 12. There is a predetermined clearance between the outer surface of such push rod 26 and the inner surface of the first bore 16. This predetermined clearance is not shown on the drawings because the clearance is too small to be easily shown on the drawing since the line for the push rod 26 and the line for the piston bore 16 would essentially superimpose on each other. Essentially this clearance determines the amount of grease that will be dispensed. The predetermined clearance, which is that portion of such first bore 16 which is not occupied by push rod 26, is always filled with grease, but none of the grease is transmitted to the second bore 28 as long as the piston member 12 is in the closed position and the valve means 34 is biased firmly against the end of first bore 16 by the second urging means 32.

In an embodiment of the invention such clearance between such push rod 26 and the inner surface of such first bore 16 is between about 0.003 and about 0.008 of an inch in diametric measurement. In the presently preferred embodiment of the invention such clearance is between about 0.004 and about 0.006 of an inch in diametric measurement. This means, for example, that where such diametric clearance would be 0.005 inch, the clearance between the outside wall of such push rod 36 and the inside wall of the first bore 16 is 0.0025 inch. The size of this clearance is very important because in many ways it determines the amount of grease that will be dispensed.

Thus, no grease is dispensed from the assembly 10 until fluid pressure is introduced. The piston member 12 and retainer member 26 are slideably movable against the first urging means 24 from a closed position to a discharge position when fluid pressure is introduced into the first cavity portion 3a of such cavity 3. The fluid pressure acts upon the retainer member 26 and the piston member 12 and forces the piston member 12 and the retainer member 26 to move in a direction away from the nozzle member 5. As the assembly is pictured in FIG. 1 such movement is to the left, however, this is not to say that it couldn't be pictured in a mirror image. The movement of the piston member 12 and retainer member 26 to the left away from nozzle member 5 by the action of the fluid pressure overcomes the preload and compresses the first urging means 24. With such piston member 12 and retainer member 26 moved to the left, the second urging means 32 continues to exert pressure on the valve means 34 thereby moving the valve means 34 and the push rod 26 to the left.

Such movement continues until the push rod 26 encounters resistance by contacting pin 38. The push rod 26 and the valve means 34 can move no further after the push rod 26 contacts such pin 38. The piston member 12 continues to move until the end of such second side of piston member 12 also contacts the pin 38 and can move no further. The additional movement that such piston member 12 travels is the predetermined distance by which the push rod 26 extends beyond the end of the second side of the piston member 12. When the piston member 12 has moved as far as possible until such piston member contacts the pin 38 such push rod 26 prevents the valve means 34 from pressing against the end of such first bore 16. with the valve means 34 no longer pressing against the end of the first bore 16, the first bore 16 now is in fluid communication with the piston cavity 15 and further is in fluid communication with the second bore 28. Grease now passes out of the first bore 16 into the cavity 15 and through such second bore 28 where the grease mixes with the fluid pressure in the exhaust passage 29. Fluid pressure from cavity 3a passes around the portion of retainer member 26 into exhaust passage 29. Grease mixed with fluid pressure in such exhaust passage 29 is expelled out of the nozzle member 5. The grease mixed with fluid pressure is dispensed as a spray.

As can be seen in FIG. 1 such exhaust passage 29 in nozzle member 5 has a larger diameter in the portion of such exhaust passage 29 that is close to the portion of the retainer member 26 and the second bore 28 that extend into the exhaust passage 29. This larger diameter portion permits such grease and such fluid pressure to mix thoroughly before the mixture is expelled out of the nozzle member 5 through the narrower portion of the exhaust passage 29.

Grease continues to be dispensed as long as fluid pressure is permitted to enter the assembly 10 and flow into first cavity portion 3a. In general practice, however, such fluid pressure is on for only a predetermined time thereby permitting only a metered amount of grease to be expelled. The amount of grease that is dispensed is determined by the clearance between the push rod 26 and the inner surface of the first bore 16 and the time that such fluid pressure is on. As mentioned previously in the presently preferred embodiment of the invention such fluid pressure is air pressure.

In a presently preferred embodiment of the invention the predetermined configuration of such piston member 12 includes a protrudent member 14 through which most of the first bore 16 is contained. It is in the protrudent member 14 that such push rod 26 is disposed.

The presence of push rod 26 in the above described operation of such nozzle assembly 10 provides a positive actuation and release of such valve means 34. This overcomes one of the serious problems that has been associated with lubricators that have used the ball type check valves in such prior art nozzles, because with the use of push rod 26 the valve means 34 cannot stick at the end of the grease dispensing bore.

The present invention describes an assembly 10 which provides a metered amount of grease to be dispensed. The fluid pressure is on for a timed period, whether it is controlled by a solenoid or by some other means, and grease is dispensed when the fluid pressure is on. When the fluid pressure supply is shut off, the piston member 12 returns to the closed position and the second urging means forces the valve means 34 back against the first bore 16 and does not permit any more grease to pass.

It must be mentioned again that the clearance between the outer surface of push rod 36 and the inner surface of such first bore 16 is very critical. If the clearance is too large then too much grease may be dispensed during each cycle that fluid pressure is applied to the assembly 10; while on the other hand if the clearance is too small then insufficient grease can get through the bore to the exhaust passage 29 and too small a quantity of grease is applied to the flange of the railway wheel.

While both the presently preferred and a number of alternative embodiments of the present invention have been described in detail above it should be understood that various other adaptations and modifications of the present invention can be envisioned by those persons who are skilled in the relevant lubrication art without departing from either the spirit of the invention or the scope of the appended claims.

I claim:

1. An assembly for dispensing lubricant, said assembly comprising:

(a) a housing member;

(b) a cavity formed in said housing member;

(c) a nozzle member connected to said housing member and having an exhaust passage formed therethrough and in fluid communication with said cavity;

(d) a lubricant passage formed in said housing member for connection to a source of lubricant under pressure;

(e) a fluid pressure inlet passage formed in said housing member and in fluid communication with at least a portion of said cavity, said fluid pressure inlet passage connectable to a source of fluid pressure;

(f) a piston member having a first predetermined configuration disposed for reciprocal movement in said cavity, said piston member having a first side adjacent said fluid pressure inlet passage and a radially opposed second side;

(g) a piston cavity formed in said first side of said piston member;

(h) a first sealing means disposed around said piston member intermediate said first side and said radially opposed second side and in sealing engagement with a wall of said cavity for both dividing said cavity into a first cavity portion in fluid communication with said fluid pressure inlet passage and a second cavity portion and preventing fluid communication between said fluid pressure inlet passage and said second cavity portion;

(i) a first bore extending longitudinally through said piston member and in fluid communication with said lubricant passage and said piston cavity;

(j) a second sealing means disposed closely adjacent an end of said second side of said piston member for preventing leakage between said lubricant passage and said second cavity portion;

(k) a first urging means disposed in said second cavity portion of said cavity and caged between an end wall of said second cavity portion and a portion of said second side of said piston member facing said end wall for biasing said piston member into a closed position;

(l) a valve means disposed in said piston cavity in contact with a first end of said first bore for controlling passage of lubricant;

(m) a retainer member having a second predetermined configuration, a portion of a first side of said retainer member connected to said first side of said piston member and having a portion of said first side disposed within said piston cavity and having at least a portion of a second side extending into said exhaust passage of said nozzle member disposed for reciprocal movement;

(n) a second bore extending longitudinally through said retainer member in fluid communication with said piston cavity and said exhaust passage formed in said nozzle member and with said first bore when said piston member is in a discharge position;

(o) a second urging means disposed in said piston cavity and caged between a wall of said retainer member facing said first end of said first bore and said valve means and exerting pressure on said valve means forcing said valve means against said first bore thereby preventing such lubricant in said first bore from passing through to said piston cavity and said second bore while said piston member is in a closed position;

(p) a push rod disposed within said first bore and extending a predetermined distance beyond said end of said second side of said piston member and having a predetermined clearance between an outer surface of said push rod and an inner surface of said first bore, one end of said push rod contacting said valve means;

wherein said piston member and said retainer member are slidingly movable against said first urging means from said closed position to a discharge position when such source of fluid pressure is introduced into said first cavity portion of said cavity permitting such fluid pressure to act upon said retainer member and said piston member such that said retainer member and said piston member are moved compressing said first urging means, said second urging means exerting pressure on said valve means thereby moving said valve means and said push rod until said push rod contacts resistance while said piston member and said retainer member continue to move for said predetermined distance until said end of said second side of said piston member also contacts resistance, said push rod preventing said valve means from contacting said first bore thereby permitting such lubricant in said first bore to be in fluid communication with said piston cavity and said second bore and such lubricant from said second bore being mixed with such fluid pressure in said exhaust passage is forced through said exhaust passage and expelled out of said nozzle member.

2. A nozzle assembly for dispensing lubricant, according to claim 1, wherein first urging means is a helical spring.

3. A nozzle assembly for dispensing lubricant, according to claim 2, wherein said helical spring has a predetermined preload.

4. A nozzle assembly for dispensing lubricant, according to claim 1, wherein second urging means is a helical spring.

5. A nozzle assembly for dispensing lubricant, according to claim 4, wherein said helical spring has a predetermined preload.

6. A nozzle assembly for dispensing lubricant, according to claim 1, wherein said piston bore is disposed substantially in a center of said piston member.

7. A nozzle assembly for dispensing lubricant, according to claim 1, wherein said second bore is disposed substantially in a center of said retainer member.

8. A nozzle assembly for dispensing lubricant, according to claim 1, wherein said predetermined configuration of said piston member includes an elongated protrudent member.

9. A nozzle assembly for dispensing lubricant, according to claim 1, wherein said predetermined clearance is between about 0.0015 and about 0.004 of an inch.

10. A nozzle assembly for dispensing lubricant, according to claim 9, wherein said predetermined clearance is between about 0.002 and about 0.003 of an inch.

11. A nozzle assembly for dispensing lubricant, according to claim 1, wherein said valve means is a ball valve.

12. A nozzle assembly for dispensing lubricant, according to claim 1, wherein a portion said exhaust passage closely adjacent said second bore is formed with a larger diameter than said second bore to permit intimate mixing of such fluid pressure and such grease.

13. A nozzle assembly for dispensing lubricant, according to claim 1, wherein such grease mixed with such fluid pressure is dispensed as a spray.

* * * * *